United States Patent
Baumgartner et al.

(10) Patent No.: US 8,342,571 B2
(45) Date of Patent: Jan. 1, 2013

(54) AIRBAG HAVING A FILLING PIECE AND AIRBAG ARRANGEMENT HAVING AN AIRBAG AND A GAS GENERATOR

(75) Inventors: Peter Baumgartner, Günzburg (DE); Thomas Steck, Elchingen (DE); Markus Leifheit, Bieberbach/Affalten (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 12/801,053

(22) Filed: May 19, 2010

(65) Prior Publication Data

US 2010/0225098 A1 Sep. 9, 2010

Related U.S. Application Data

(63) Continuation of application No. PCT/EP2008/065939, filed on Nov. 20, 2008.

(30) Foreign Application Priority Data

Nov. 20, 2007 (DE) .......................... 10 2007 056 137

(51) Int. Cl.
*B60R 21/26* (2011.01)
*B60R 21/2346* (2011.01)
*B60R 21/217* (2011.01)

(52) U.S. Cl. ..................... 280/740; 280/728.2; 280/736

(58) Field of Classification Search ............... 280/728.2, 280/736, 740, 742, 730.2
See application file for complete search history.

(56) References Cited

U.S. PATENT DOCUMENTS

| 5,560,645 | A | 10/1996 | Lewis et al. | |
|---|---|---|---|---|
| 6,224,089 | B1 * | 5/2001 | Uchiyama et al. | 280/728.2 |
| 6,293,581 | B1 | 9/2001 | Saita et al. | |
| 6,447,003 | B1 * | 9/2002 | Wallentin et al. | 280/728.2 |
| 6,783,148 | B2 | 8/2004 | Henderson | |
| 6,808,203 | B2 | 10/2004 | Takahara | |
| 6,811,184 | B2 * | 11/2004 | Ikeda et al. | 280/742 |
| 6,860,506 | B2 | 3/2005 | Ogata et al. | |
| 6,877,771 | B2 | 4/2005 | Weber | |
| 6,945,556 | B2 * | 9/2005 | Maertens | 280/729 |
| 6,962,364 | B2 * | 11/2005 | Ju et al. | 280/730.2 |

(Continued)

FOREIGN PATENT DOCUMENTS

DE 102 11 061 A1 10/2002

(Continued)

OTHER PUBLICATIONS

Anonymous: "Fabric diffuser panel for air bag module", Research Disclosure, Mason Publications, Hampshire, GB, vol. 440, No. 115, Dec. 1, 2000, XP007127300; ISSN 0374-4353.

*Primary Examiner* — Joseph Rocca
*Assistant Examiner* — Barry Gooden, Jr.
(74) *Attorney, Agent, or Firm* — Foley & Lardner LLP

(57) ABSTRACT

The invention relates to an airbag, the airbag comprising a tubular area and a filling piece for filling the airbag with gas of a gas generator, wherein the filling piece is formed by putting-over the tubular area of the airbag. In one embodiment, the filling piece is formed by putting-over the tubular area of the airbag in the longitudinal direction, wherein an end of the put-over tubular area faces the airbag interior and said end of the put-over tubular area comprises one or several openings which are arranged to distribute gas inflowing from a gas generator in a targeted manner into the airbag.

11 Claims, 15 Drawing Sheets

U.S. PATENT DOCUMENTS

| | | | |
|---|---|---|---|
| 7,422,231 B2 * | 9/2008 | Kismir et al. ............. 280/728.1 |
| 2002/0105174 A1 | 8/2002 | Tanase et al. |
| 2004/0104561 A1 * | 6/2004 | Maertens ................... 280/730.2 |
| 2004/0104563 A1 | 6/2004 | Fischer |
| 2005/0121884 A1 * | 6/2005 | Ogata et al. ................ 280/728.2 |
| 2006/0108777 A1 * | 5/2006 | Mabuchi et al. ........... 280/730.2 |
| 2006/0108778 A1 * | 5/2006 | Ochiai et al. ............... 280/730.2 |
| 2006/0119081 A1 * | 6/2006 | Heimberger et al. ...... 280/728.2 |
| 2006/0255570 A1 * | 11/2006 | Wipasuramonton et al. . 280/729 |
| 2007/0228709 A1 | 10/2007 | Khouri |
| 2007/0257475 A1 * | 11/2007 | Fukuda et al. ................ 280/736 |
| 2008/0088118 A1 * | 4/2008 | Wipasuramonton et al. ......................... 280/728.2 |
| 2008/0111357 A1 | 5/2008 | Heninger et al. |
| 2008/0136143 A1 | 6/2008 | Boxey |
| 2008/0136148 A1 | 6/2008 | Boxey |
| 2008/0164680 A1 * | 7/2008 | Langue ...................... 280/728.2 |
| 2008/0238047 A1 * | 10/2008 | Komiyama ................ 280/728.2 |
| 2008/0290634 A1 * | 11/2008 | Sugimori et al. .......... 280/728.2 |
| 2009/0236829 A1 * | 9/2009 | Tanaka et al. ............... 280/728.2 |
| 2010/0164209 A1 * | 7/2010 | Magnin et al. ................. 280/740 |
| 2010/0207368 A1 * | 8/2010 | Weyrich ........................ 280/736 |
| 2010/0225098 A1 * | 9/2010 | Baumgartner et al. ....... 280/736 |

FOREIGN PATENT DOCUMENTS

| | | |
|---|---|---|
| DE | 202 16 339 U1 | 4/2003 |
| DE | 202 18 550 U1 | 5/2003 |
| DE | 20 2004 016 975 U1 | 2/2005 |
| DE | 103 20 938 A1 | 3/2005 |
| DE | 10 2004 028 319 A1 | 6/2006 |
| DE | 10 2007 016 038 A1 | 10/2007 |
| DE | 10 2007 059 782 A1 | 7/2008 |
| EP | 1 273 486 A2 | 1/2003 |
| EP | 1 340 656 A2 | 9/2003 |
| EP | 1 373 029 B1 | 1/2004 |
| EP | 1 826 072 A1 | 8/2007 |
| GB | 2 314 300 A | 12/1997 |
| GB | 2 399 795 A | 9/2004 |

* cited by examiner

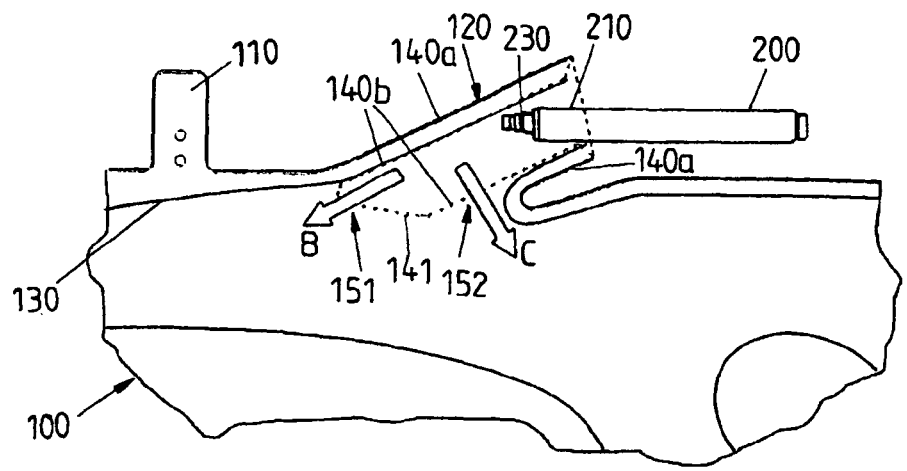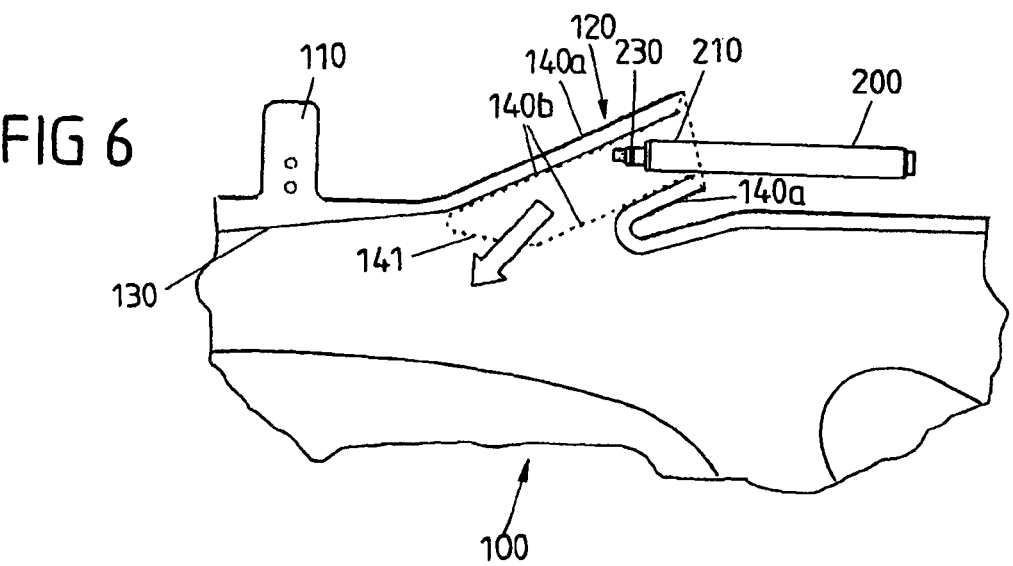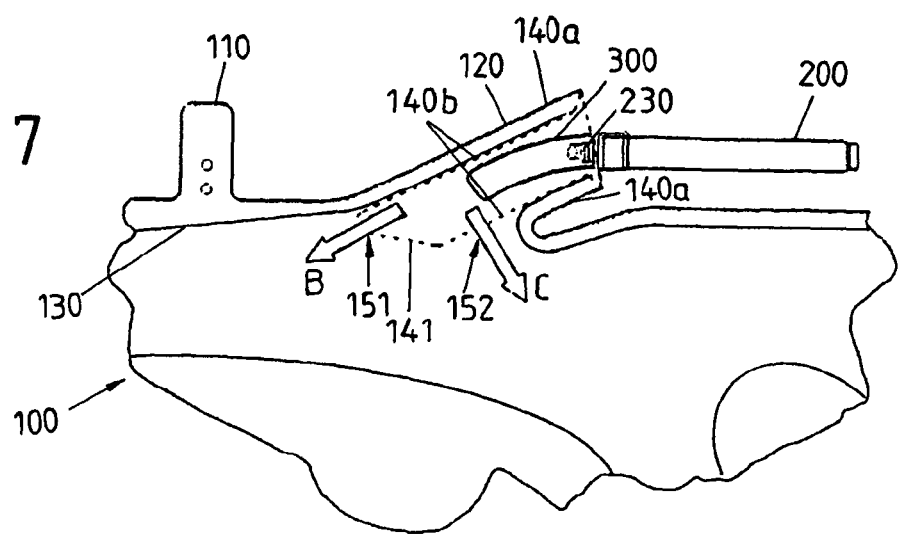

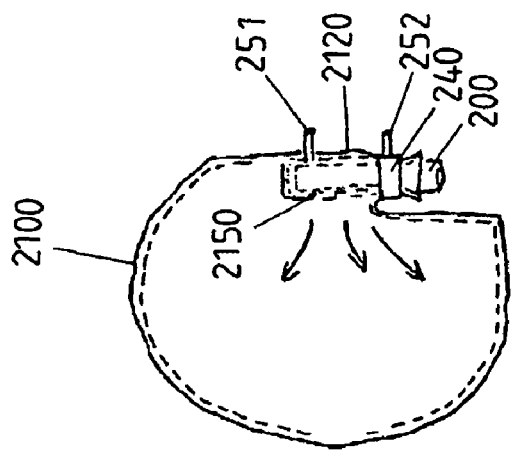
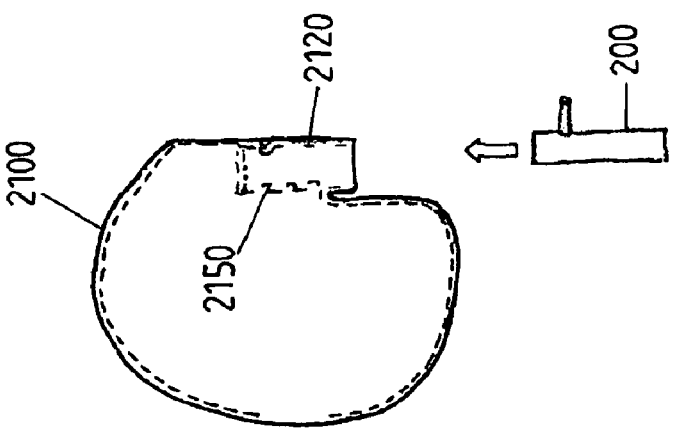
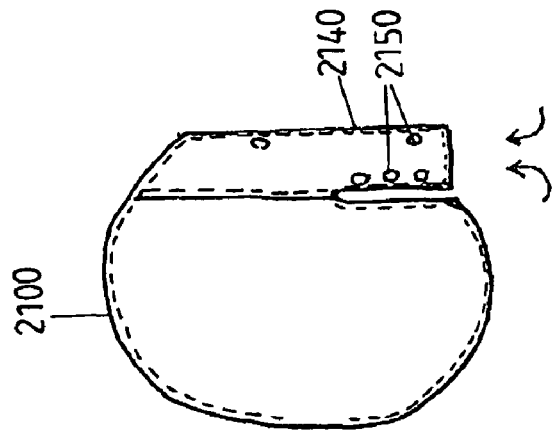

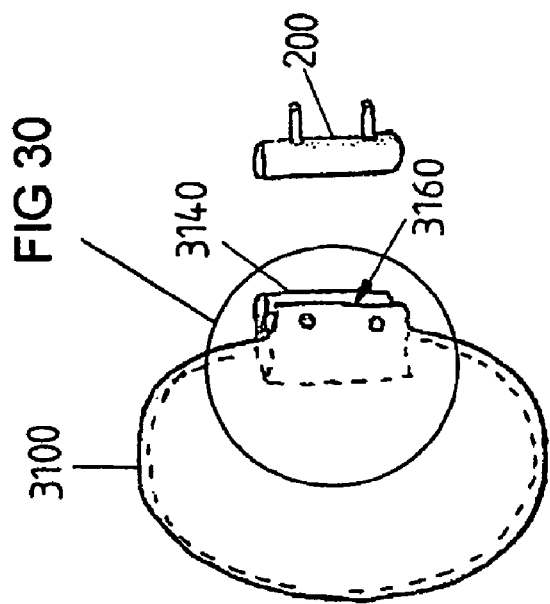
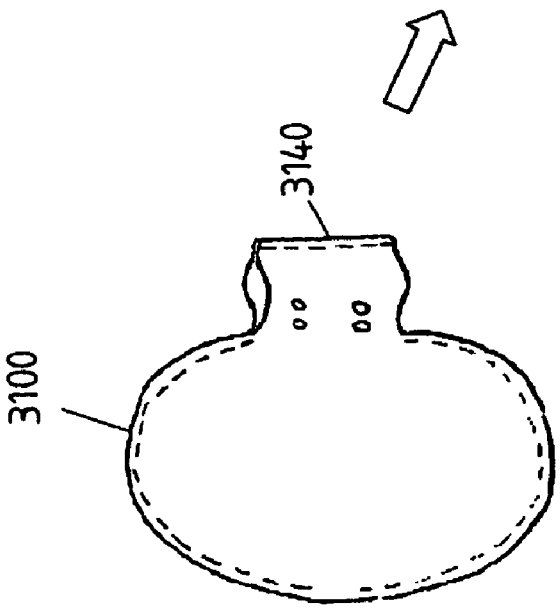
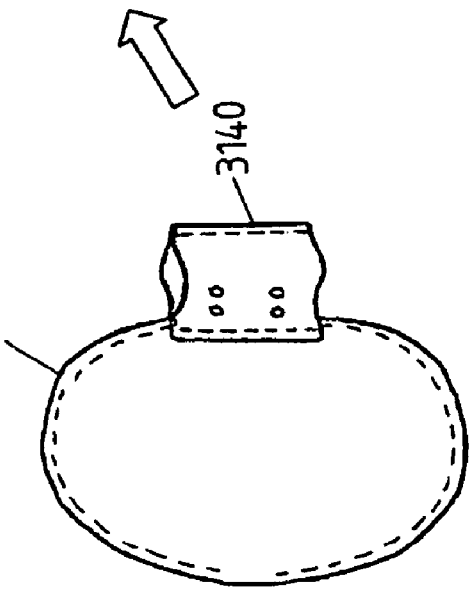

US 8,342,571 B2

AIRBAG HAVING A FILLING PIECE AND AIRBAG ARRANGEMENT HAVING AN AIRBAG AND A GAS GENERATOR

CROSS REFERENCE TO RELATED APPLICATIONS

This application is a continuation of International Patent Application PCT/EP2008/065939, filed Nov. 20, 2008, which was published in German on May 28, 2009 as WO 2009/065907 A2. The foregoing International Application is incorporated herein by reference in its entirety.

BACKGROUND

The invention relates to an airbag having a filling piece.

It is known to form a filling piece at an airbag in order to fill the airbag of a vehicle occupant restraining system with gas, via which filling piece the airbag can be filled with the gas of a gas generator. A problem of such arrangements is to ensure that the airbag is not damaged by the inflowing gases.

There exists a need to provide an airbag having a filling piece which enables the filling of an airbag with gas in a simple manner wherein the thermal load of the airbag shall be small.

SUMMARY

The invention provides for an airbag that comprises a filling piece for filling the airbag with gas of a gas generator, wherein the filling piece is formed by putting-over a tubular area of the airbag.

In one embodiment an airbag is provided, the airbag comprising a tubular area and a filling piece for filling the airbag with gas of a gas generator, wherein the filling piece is formed by putting-over the tubular area of the airbag in the longitudinal direction. An end of the put-over tubular area faces the airbag interior and said end of the put-over tubular area comprises one or several openings which are arranged to distribute gas inflowing from a gas generator in a targeted manner into the airbag.

In another embodiment an airbag is provided, the airbag comprising a tubular area and a filling piece for filling the airbag with gas of a gas generator, wherein the filling piece is formed by putting-over the tubular area of the airbag in the longitudinal direction. There is further provided at least one additional reinforcing layer, said at least one additional reinforcing layer being secured to the tubular area, and said at least one additional reinforcing layer being at least partially also put-over during putting-over of the tubular area.

In still another embodiment an airbag is provided, the airbag comprising a tubular area and a filling piece for filling the airbag with gas of a gas generator, wherein the filling piece is formed by putting-over the tubular area of the airbag in cross direction.

BRIEF DESCRIPTION OF THE DRAWINGS

These and other features, further details, aspects and advantages of the present invention are clarified by means of the following description, appended claims and the accompanying exemplary description of embodiments of the invention on the basis of the Figures.

FIG. 5 shows an airbag and a filling piece according to FIG. 1, wherein a gas generator is arranged in the put-over filling piece and the filling achieves a gas distribution function;

FIG. 6 shows an airbag having a filling piece according to FIG. 1, wherein a gas generator is arranged in the filling piece and the filling piece is formed to lead gas into the airbag without a gas distribution function;

FIG. 7 shows an airbag having a filling piece according to FIG. 5, wherein an additional diffuser being connected to a gas generator is arranged in the filling piece;

FIG. 24 shows an embodiment of the tubular area according to FIG. 21 in which the face side of the tubular area is stitched up;

FIG. 25 shows the airbag of FIG. 24 with a tubular area put over inwardly and forming a put-over diffuser;

FIG. 26 shows the airbag of FIG. 25 with a mounted gas generator, wherein a gas escape from the put-over diffuser only takes place to the front;

FIG. 27 shows an exemplary embodiment of a spread, non-inflated side airbag which forms a tubular area formed by the airbag cut, which area is designed and provided for putting-over cross the longitudinal axis;

FIG. 28 shows the airbag of FIG. 27, wherein the tubular area is formed by a separate part and is sewed together with the airbag;

FIG. 29 shows the airbag of FIG. 27 or 28 in which the tubular area is put-over cross the longitudinal axis and forms a receptacle for a gas generator;

DESCRIPTION

Figure 1:
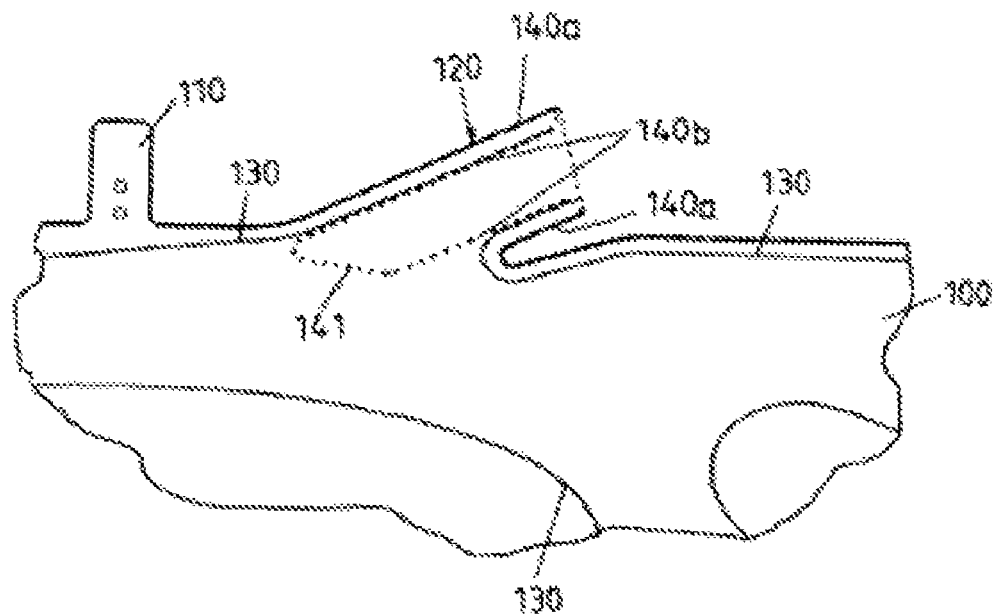
FIG. 1 shows a detail of a spread, non-inflated airbag having a filling piece formed according to a first exemplary embodiment.

Generally, according to embodiments of the invention provision is made for forming the filling piece of an airbag by putting-over or everting a tubular area of the airbag. The filling piece of a conventional airbag is in a way provided in a prolonged manner and then put over inwardly. In doing so, the airbag receives an additional protective layer in the filling piece without making it necessary that any airbag material would have to be separately cut out, sewed and subsequently mounted within the airbag in order to provide the additional layer. Thus, the assembly is simple since the put-over filling piece consists of the airbag material of the airbag and does not need additional parts.

The additional protective layer prevents the hot gas coming into contact with the outer skin of the airbag fabric immediately after the gas leaves the gas generator so that the inflowing gas does not or only marginally damage the airbag.

A put-over filling piece can be used both for sewed as well as for glued or woven airbags.

In an embodiment, the end of the tubular area facing the interior of the airbag after it is everted extends into the interior of the airbag. Thereby, it is possible that the gas flowing through the filling piece into the airbag directly flows into the interior of the airbag and can there be suitably distributed.

In a further embodiment, provision is made that the end of the tubular area facing the interior of the airbag after everting the tubular area comprises means which effect that the gases flow into the airbag directly, e.g., to ensure a uniform filling of the airbag. Thereto, e.g., provision is made that the end of the tubular area facing the interior of the airbag after it is everted has one or more seams which define openings distributing the inflowing gas in the airbag in a targeted manner during filling the airbag. Alternatively or additionally it is also possible that the everted tubular area comprises one or more lateral openings which serve for a targeted distribution of gas in the interior of the airbag. Provision can also be made for that the end of the tubular area is formed inclined with respect to the longitudinal extension of the tubular area, whereby the inflow direction can be further influenced.

In a further embodiment, the airbag possesses an outer edge extending longitudinally and the tubular area extends before its everting essentially parallel to this outer edge. This makes it possible to keep the height of the airbag cut, which is used for producing the airbag, constant as compared to airbags which comprise a simple filling piece without additional everted protective layer. It is achieved by a constantly remaining height of the airbag cut that no additional material costs occur.

In a further embodiment, provision is made for that the tubular area of the airbag comprises at least one additional reinforcing layer which, during everting, is at least partially also everted. Therefore, e.g., two additional fabric pieces are sewed or glued onto the upper or lower side of the tubular area. Subsequently, the tubular area is everted together with these additional fabric pieces. This results in a further reinforcement of the filling piece by providing a further protective layer at least in sections of the filling piece. Thereby, provision can also be made for that the additional protective layer is made of another material than the airbag and is, e.g., thermally resistant to a particular extent. Generally, a plurality of such additionally reinforcing layers, optionally of different materials, can be fixed on the tubular area of the airbag to be everted.

In a further embodiment, areas of the at least one additional fabric layer are connected to each other in such a way that they close the end of the tubular area at least partially. The nonclosed areas thereby form one or several openings which distribute the inflowing gas during filling the airbag in a targeted manner in the airbag, after everting the tubular area.

In an implementing variant, the airbag is formed such that it is suited for receiving at least a section of a gas generator or for receiving at least a section of a diffuser being connected to a gas generator.

In a variant, the filling piece is, as already explained, formed by everting a tubular area in longitudinal direction. That end of the tubular area projecting from the airbag is thereby pulled into the interior of the airbag. In a further embodiment, a filling piece is, in contrast, formed by putting-over a tubular area in cross direction. Particularly, the filling piece is thereby formed by putting-over in cross direction a tubular area being open at both ends and being connected to the airbag at a longitudinal side. Thereby, the tubular area forms in the interior of the airbag an essentially cylinder-shaped diffuser after the putting-over in cross direction.

The filling piece and the tubular area are an integral component of the airbag. Thereby, particularly a gas lance is not concerned which is only inserted into the airbag. E.g., the tubular area is a component of the airbag cut of which the airbag is produced. In a further implementing variant, provision can be made for that a tubular area is a part fixedly connected to the airbag, in particular sewed or glued. This can consist of another, in particular stronger airbag fabric or of another material than the airbag so that a filling piece can be implemented in a particular stable or heat resistant manner.

The put-over tubular area in one embodiment forms a diffuser in the interior of the airbag which diffuser distributes the gas of a gas generator in the airbag in a targeted manner. The diffuser can be formed such that it guides gas of a gas generator over one or several escape openings directly into the airbag.

The production of an airbag having a put-over filling piece is, e.g., carried out by exerting the following steps:

providing two two-dimensional airbag layers which have in each case a laterally projecting area extending longitudinally, connecting the two airbag layers, wherein the two areas extending longitudinally and projecting laterally form an open tubular area being at least partially open at its end, and everting the tubular area for forming a filling piece of the airbag.

The production of an airbag having a put-over filling piece is carried out in an alternative production method by exerting the following steps:

providing an airbag having an opening, providing a tubular part, connecting the tubular part with the airbag in the area of the opening of the airbag, and putting-over the tubular area for forming a filling piece of the airbag.

In a further aspect, an airbag arrangement having an airbag and a gas generator is provided. The airbag has a filling piece and can be filled with gas of a gas generator via the filling piece, the gas escaping from the escape area of the gas generator. According to the further aspect, the gas escape area of the gas generator is at least partially surrounded by a fabric protective element mounted to the gas generator and at least a section of the gas generator is arranged together with the fabric protective element in the filling piece of the airbag.

Thus, an additional protective layer for the gas generator is provided, which can also be named as hood, which is mounted to the gas generator and directly surrounds the gas escape area of the gas generator. The pre-mounted combination of gas generator and fabric protective element is then inserted into the filling piece of the airbag and connected to the filling piece. Thereby, the filling piece can be formed in a plain manner or—according to an aspect of the invention—in a put-over manner.

The material of the fabric protective element can generally be arbitrary. Besides the use of an airbag material, also other materials including coated tissue or plastics can be used.

The fabric protective element is, e.g., tubular formed and can provide means like, e.g., seams which ensure that the section of the gas generator projecting into the fabric protective element is fixed with respect to the fabric protective element. Provision can also be made for that the fabric protective element tapers and, thereby, acts as nozzle for the escaping gases.

Figure 2:
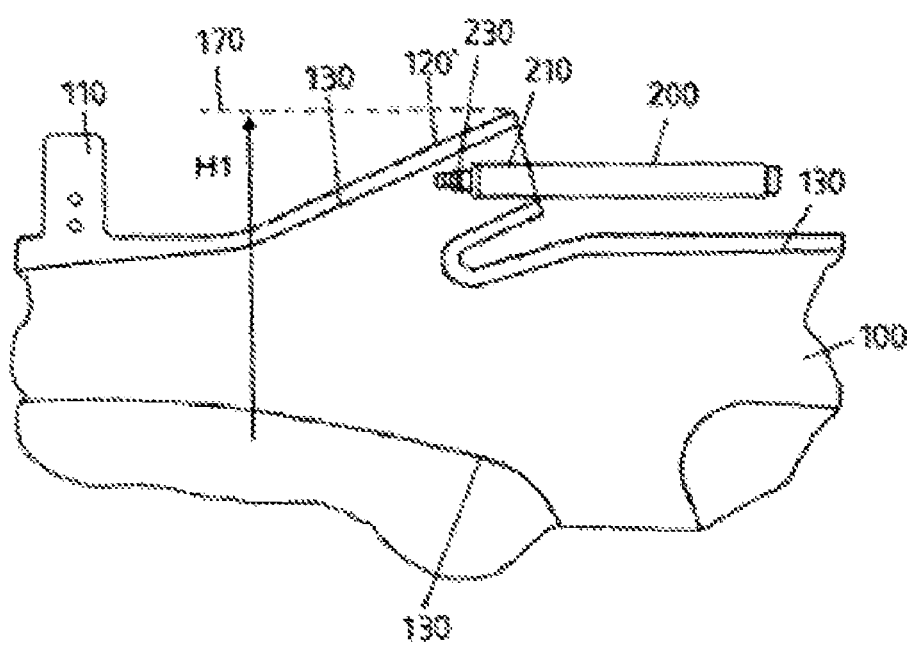
FIG. 2 shows a known airbag having a filling piece.

Now referring to the Drawings, for a better understanding of the invention, firstly a known airbag is discussed referring to FIG. 2. Thus, a known airbag 100 has a filling piece 120' which serves for receiving at least a partial section 210 of a gas generator 200, wherein the partial section 210 arranged in the filling piece has a gas escape area 230 out of which gas generated by the gas generator 200 escapes in case of activation. The filling piece 120' is tightly fixed at the gas generator 200 and severs for leading the gas flowing out of the gas generator 200 into the interior of the airbag 100.

FIG. 2 further depicts seams 130 of the airbag by which an upper layer and a lower layer of an airbag cut are connected to each other as well as a securing tab 110 for securing the airbag to the vehicle structure.

An airbag cut being necessary for producing the airbag 100 possesses defined dimensions in the two spatial directions. In FIG. 2, a height H1 of an airbag cut is depicted which is defined by the distance between a lower edge (not depicted) of the cut and an upper edge 170, wherein the upper edge 170 is defined by the upper end of the filling piece 120' projecting from the actual airbag. The height H1 of the airbag cut determines the amount of airbag material which is necessary for producing the airbag and influences thereby the material and producing costs.

Figure 3:
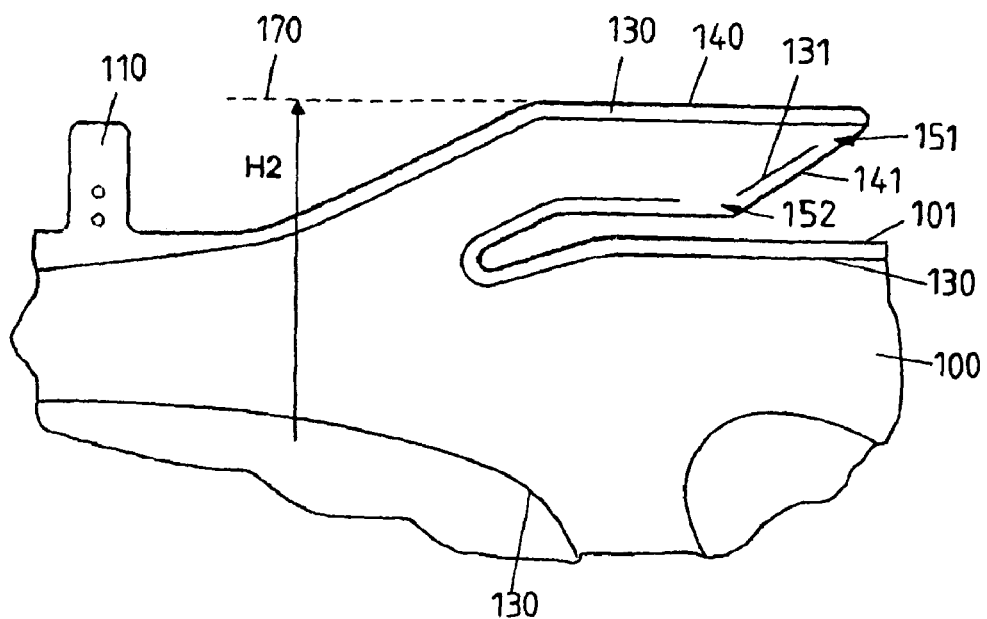
FIG. 3 shows an airbag having a filling piece according to FIG. 1, wherein the airbag is depicted in a manufacturing step in which it forms a tubular area which will form, after everting, the filling piece of FIG. 1.
Figure 4:
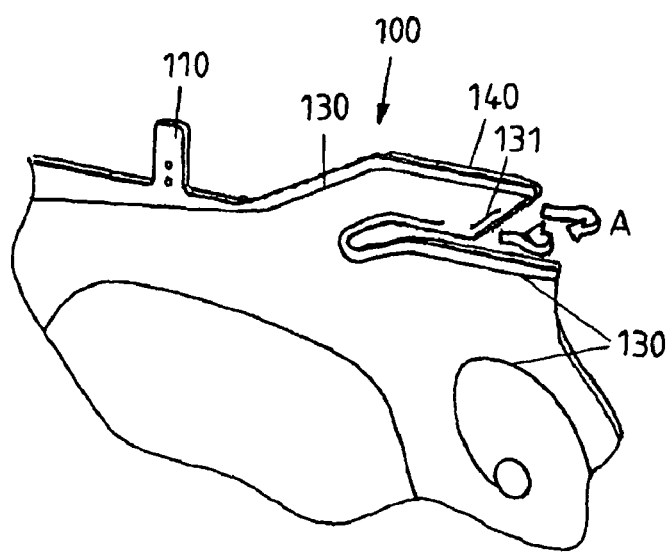
FIG. 4 shows the airbag in the manufacturing state of FIG. 3, wherein the process of everting the tubular area is indicated.

FIG. 1 shows an airbag 100 having a filling piece 120 which is formed by an inwardly put over or everting of tubular area of the airbag. The filling piece 120 thus consists of two material layers 140a, 140b of the same tubular part 140 which is depicted in FIGS. 3 and 4. The filling piece is thus prolonged as compared to the known filling piece 120' of FIG. 2 and the prolonged part is inwardly put over or everted. The according prolonged filling piece is thereby designated in the context of this description as tubular area in order to terminologically differentiate it from the ready filling piece 120.

Thus, an additional protective layer 140b is present which is integrally formed out of the airbag cut and does not form a separate part and can in particular be provided without the necessity of cutting out, sewing and subsequent inserting into the airbag or filling piece. Due to the manufacturing process of everting a longitudinally tubular area being at least partially open at its end, a filling piece 120 is present, the two layers of which are continuously connected to each other at the face side end of the filling piece 120 by a fold and which consist of the same material cut.

In FIG. 3 also seams 130 are depicted which connect an upper and a lower airbag layer with each other for forming one or several chambers or areas of the airbag 100.

It is pointed out that the airbag depicted in the FIGs is a head airbag (side curtain) deploying along the lateral window front. This is to be understood only exemplarily. Generally, also differently formed and arranged airbags can be provided with a put-over filling piece.

FIG. 3 shows the airbag 100 with a tubular area 140 and in a state before the filling piece 120 with two fabric layers 140a, 140b (cf. FIG. 1) is formed by everting the tubular area 140. The airbag 100 consists of two two-dimensional airbag layers having a congruent contour which are connected to each other by seams 130. Instead of a connection by seams 130, alternatively a glue connection can be carried out. It is also generally thinkable that a woven single-part airbag is used.

The two airbag layers which form the airbag 100 thereby have in each case an area extending longitudinally and projecting laterally, wherein, after connecting the two airbag layers, the two areas extending longitudinally and projecting laterally form the tubular area 140.

In an embodiment, but not necessarily, provision is made for that the tubular area 140 extends essentially parallel to an outer edge 101 of the airbag extending longitudinally. Thereby, it is achieved that the height H2 of the airbag cut necessary for the production of the airbag does not need to be enlarged with respect to the height of an airbag cut for a known airbag according to FIG. 2, i.e., the height H2 of FIG. 3 is equal to the height H1 of FIG. 2. Since the height of the airbag cut does not increase due to the provision of a put-over filling piece, no additional material costs incur. In contrast, in other embodiments provision can be made for that the tubular area 140 extends angularly with respect to the adjacent outer edge 101 of the airbag.

The end 141 of the tubular area 140 facing in FIG. 3 away from the airbag 100 can have one or several seams which define openings distributing the inflowing gas in the airbag in a targeted manner during filling the airbag. Thereby, it is to be noted that the end 141 faces the interior of the airbag after everting the tubular area.

In the exemplary embodiment of FIG. 3, a seam 131 is provided at the end 141 of the tubular area 140, which seam 131 defines two gas escape openings 151, 152. The lower gas escape opening 152 thereby extends partially lateral, i.e. the gas escape takes place perpendicular to the longitudinal axis of the tubular area 140. The seam 131 and the gas escape openings 151, 152 depicted in FIG. 3 are to be understood only exemplarily. One or more seams can be formed also in another manner at the end 141 or laterally at the tubular area 140, wherein openings are provided in each case letting the gases escaping from the gas generator flow into the airbag in a directed and targeted manner in order to achieve a uniform filling of the airbag and/or a targeted filling of single chambers of the airbag.

FIG. 4 indicates by arrows A the step of everting the tubular area 140. The filling piece provided after everting the tubular area is depicted in FIG. 1.

FIG. 5 shows the airbag according to FIG. 1 together with the gas generator 200 and by depicting the introducing ways B, C of the inflowing gas into the airbag 100. The gas generator 200 is arranged in the filling piece 120 with a section 210 comprising a gas escape area 230 of the gas generator. The connection of the filling piece 120 to the gas generator 200 is effected in a conventional manner. In case of activation, gas escapes out of the gas escape area 230 and enters the filling piece 120. The escaping gases thereby only come in contact with the inner protective layer 140*b* which is formed by the tubular area of FIG. 3 inwardly put-over. Thereby, it is prevented that the gas flowing out of the gas generator 200 damages the outer skin of the airbag. The gas is then guided through gas escape openings 151, 152 in two partial streams B, C from the inner protective layer 140*b* into the airbag 100. The air inflow into the airbag can be controlled by the size and number of openings, wherein provision can be made for different chambers of the airbag to be filled with gas in a distinct manner.

The filling piece 120 acts, due to its gas distribution function, as diffuser and can also be designated as put-over diffuser. The put-over diffuser 120 thereby is no separate part but is produced out of the airbag cut of the airbag.

FIG. 6 shows an alternative embodiment which differs only with respect to the gas inflow into the interior from the airbag of the embodiment of FIG. 5. Thus, in the embodiment of FIG. 6, the put-over protective layer 140*b* is provided with only one opening at its end or face area 141 so that the protective layer 140*b* does not achieve a separate gas distribution function.

FIG. 7 shows an exemplary embodiment in which an additional diffuser 300 is arranged in the filling piece 120, the diffuser 300 being connected to a gas generator 200. The gas escaping from the diffuser 300 flows then, according to FIG. 5, directed in gas streams B, C through the gas escape openings 151, 152 into the airbag 100. The use of a diffuser 300 can, e.g., also be effected in combination with the embodiment of FIG. 6.

It is pointed out that the end 141 of the inner protective layer 140*b* is beveled in the depicted embodiments, i.e., it does not extend perpendicular to the longitudinal axis of the filling piece 120. By the beveling of the end 141 of the inner protective layer 140*b* influence can additionally be exerted on the flow direction of the gases entering the airbag. The beveling of the end 141 of the inner protective layer is, however, only exemplarily provided and is in no way mandatory.

The gas generator 200 depicted in the FIGs is an elongatedly formed gas generator, e.g., a tubular gas generator. The use of an airbag having a put-over filling piece is, however, also possible in connection to other gas generators, optionally by additionally using a diffuser, as exemplarily depicted in FIG. 7.

FIGS. 8A to 8D show an exemplary embodiment in which an additional reinforcing layer is secured to the tubular area 140, the additional reinforcing layer being also everted at least partially during everting. According to FIG. 8A, the additional reinforcing layer consists, e.g., of two fabric pieces 161, 162, wherein the fabric piece in each case is sewed or glued onto the upper side and the lower side of the tubular area 140.

Figure 8A:
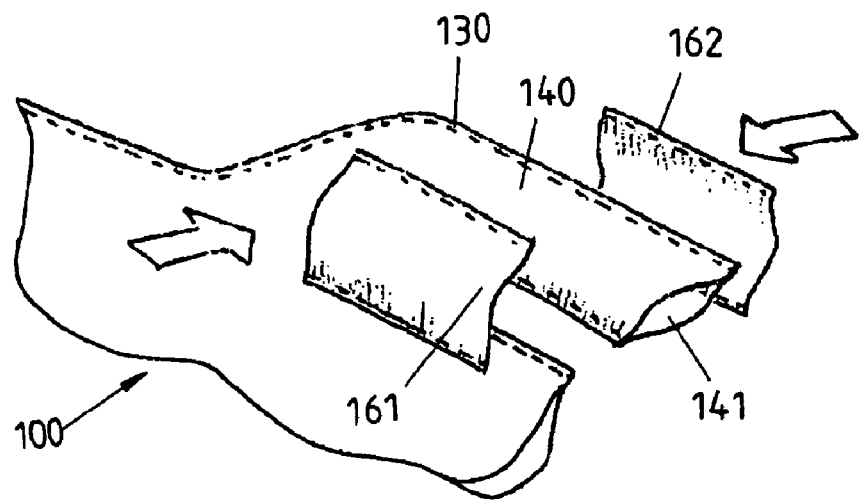
FIG. 8A shows an airbag in a manufacturing state according to FIG. 3, wherein an additional reinforcing layer is arranged at the outside of the tubular area.
Figure 8B:
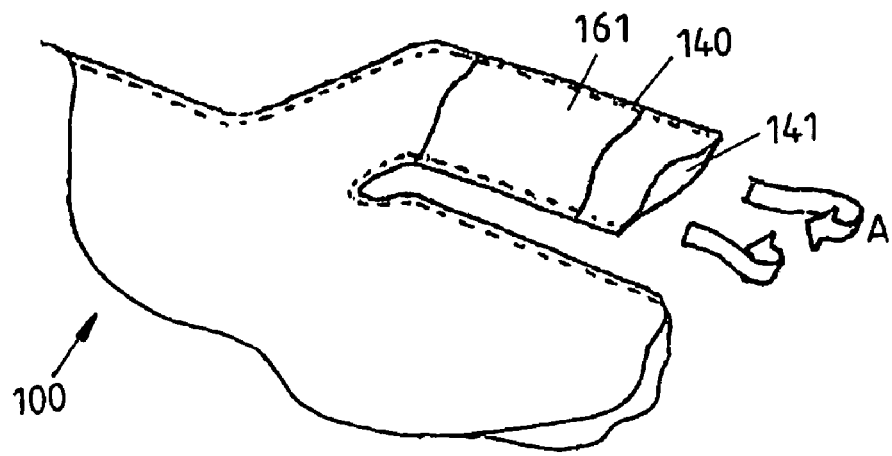
FIG. 8B shows the airbag of FIG. 8A, wherein the reinforcing layer is sued to the tubular area and the everting of the area with the reinforcing layer is indicated.
Figure 8C:
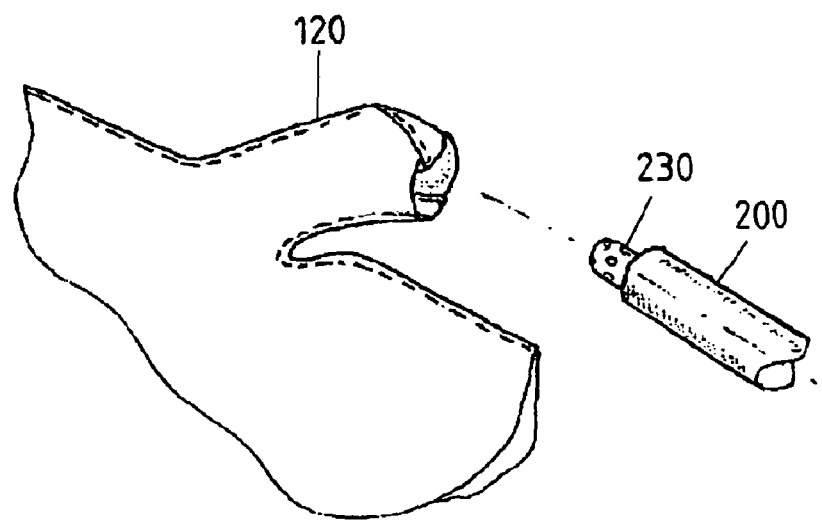
FIG. 8C shows an airbag having a filling piece which is formed by everting the tubular area with reinforcing layer of FIG. 8B.
Figure 8D:
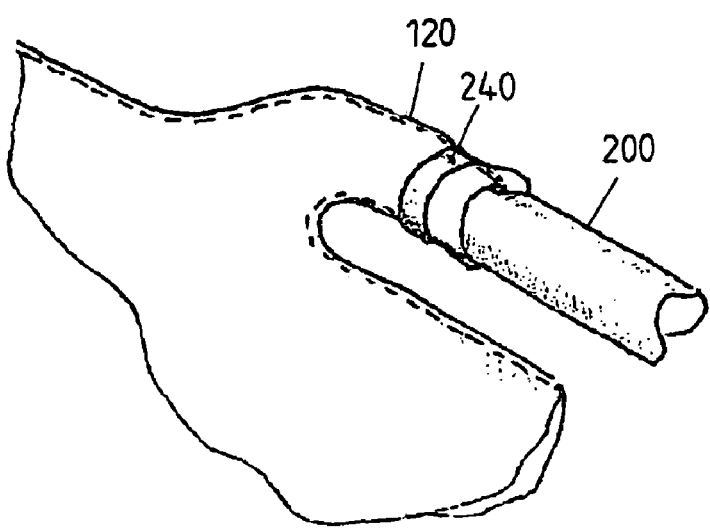
FIG. 8D shows the airbag of FIG. 8C with a gas generator arranged in the filling piece and connected to it.

FIG. 8B shows the tubular area 140 with the reinforcing fabric pieces 161 secured to it. After securing the reinforcing layers 161, 161, the tubular area 140 is again inwardly everted as indicated by arrows A. Thereby, the reinforcing layers 161, 162 are at least partially also everted. The result is depicted in FIG. 8C. The additional reinforcing layers 161, 162 form the innermost protective layer of the filling piece 120 and further shield the airbag 100 from escaping gases. An elongated gas generator 200 with a gas escape area 230 is inserted into the filling piece 120 and secured to it according to FIG. 8D. The securing is, e.g., carried out by a clamp 240 which encompasses a collar-shaped area of the gas generator 200 and the filling piece 120 in an essentially gas-tight manner.

Figure 14A:
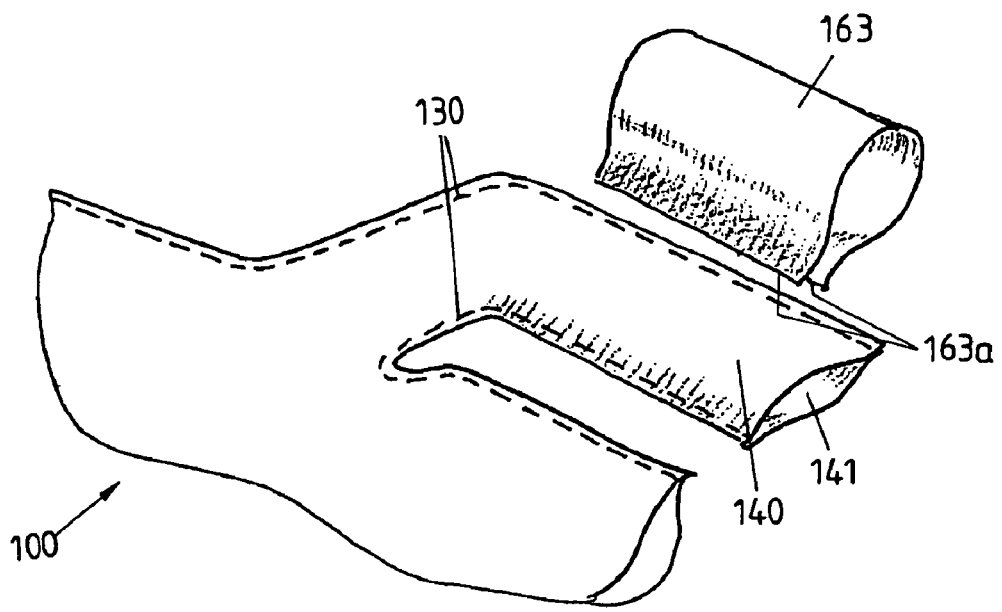
FIG. 14A shows a further exemplary embodiment of an airbag having an additional reinforcing layer at the outside of the tubular area.
Figure 14B:
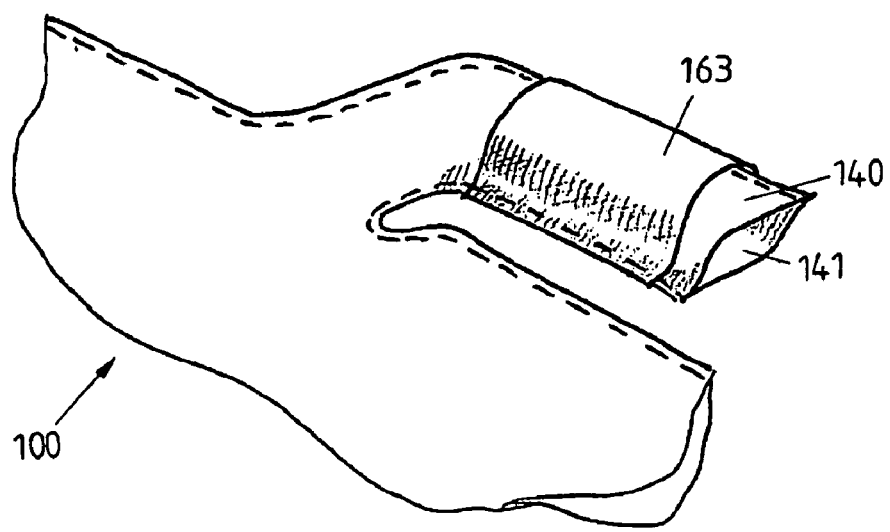
FIG. 14B shows the airbag of FIG. 14A, wherein the reinforcing layer is fixed to the tubular area.

FIGS. 14A, 14B relate to a variation of the exemplary embodiment of FIGS. 8A to 8D in which an additional reinforcing layer consists of a rectangular fabric piece 163 which is laid around the tubular area 140 and is sewed or glued to the tubular area at its ends 163*a*. Securing the ends 163*a* of the reinforcing layer 163 to the tubular area 130 is thereby preferably carried out in the area of the seams 130 of the tubular area 140. FIG. 14B shows the readily mounted tubular area 140 with the reinforcing layer 163 secured thereto. The tubular area 140 formed in this manner is subsequently inwardly everted together with the reinforcing layer 163, according to the depiction of FIGS. 8C and 8D.

Figure 15A:
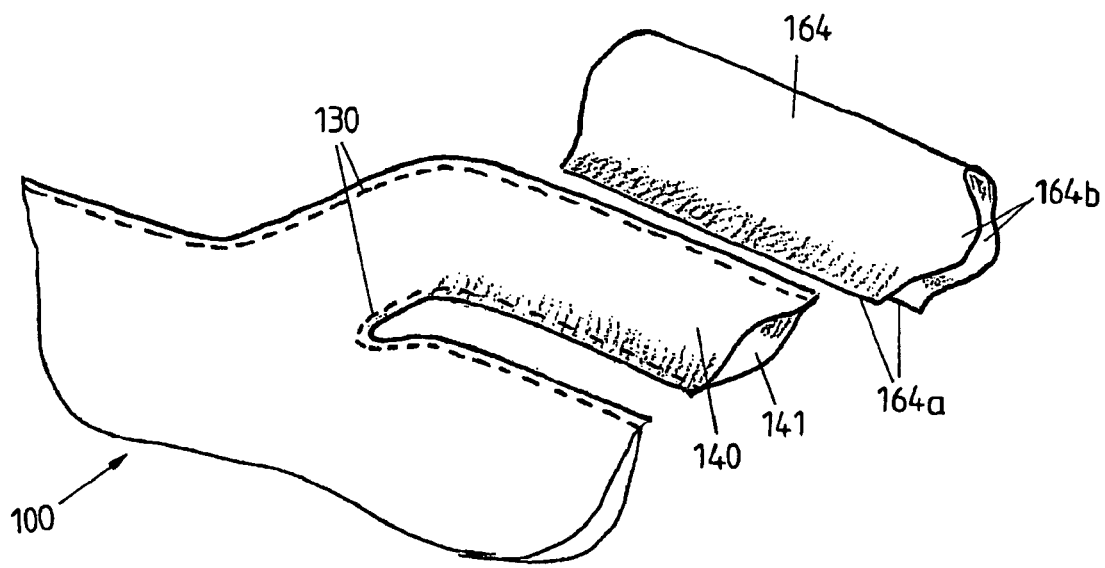
FIG. 15A shows a further embodiment of an airbag having an additional reinforcing layer at the outside of the tubular area.
Figure 15B:
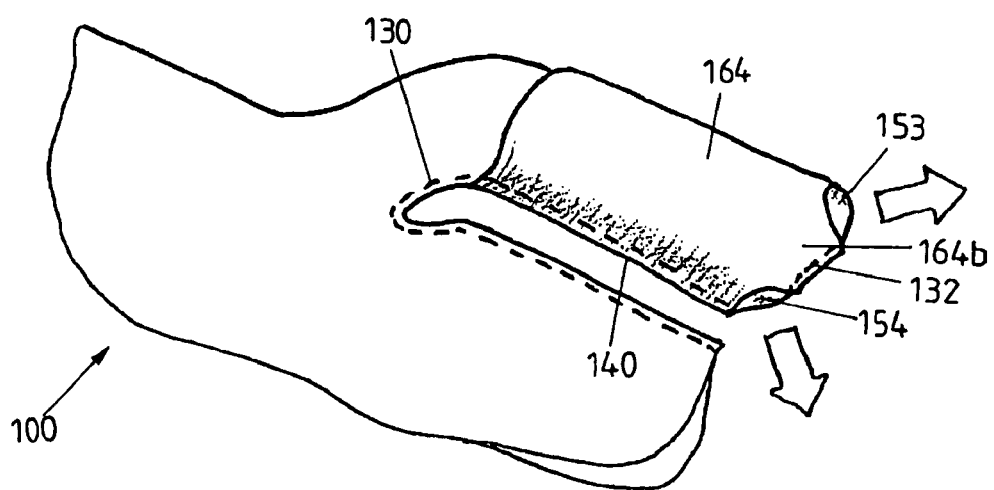
FIG. 15B shows the airbag of FIG. 15A, wherein the reinforcing layer is fixed to the tubular area.

FIGS. 15A, 15B show a further variation of an exemplary embodiment in which an additional protective layer is secured to the tubular area 140. The additional reinforcing layer consists like in case of the exemplary embodiment of FIGS. 14A, 14B of a fabric piece 164 which is laid around the tubular area 140 and is sewed or glued to this at its ends 164*a*. However, an embodiment according to FIGS. 8A, 8B with two separate fabric pieces could also be present. The fabric piece 164 has thereby two projecting areas 164*b* at its face side facing away from the airbag interior.

Different to the exemplary embodiments of FIGS. 14A, 14B and 8A, 8B, the reinforcing layer 164 is also at its face side sewed or glued along a seam 132, namely along the projecting areas 164*b* so that the end 141 of the tubular area 140 is partially closed. Thereby, two gas escape openings 153, 154 are formed adjacent to the projecting areas 164*b* sewed or glued together, out of which gas escape openings 153, 154 gas can escape. After everting the tubular area 140 according to FIGS. 8C, 8D, these openings 153, 154 face the airbag interior. A targeted filling of the airbag with gas is possible by the two gas escape openings 153, 154. Size and location of the gas escape openings 153, 154 can be influenced by length and shape of the seam 132 and thereby the filling of the airbag with gas can be adjusted in a targeted manner. It is also possible that several face-sided seams are provided at the reinforcing layer.

FIGS. 9A to 13B relate to exemplary embodiments in which the gas escape area of the gas generator is at least partially surrounded by a fabric protective element mounted at the gas generator, wherein a section of the gas generator is, together with the fabric protective element, arranged in the filling piece of the airbag. The filling piece thereby can be a put-over filling piece according to FIGS. 1 and 3 to 8D. The use of a fabric protective element arranged at the gas escape area is also possible in combination with single-layered filling pieces.

Figure 9A:
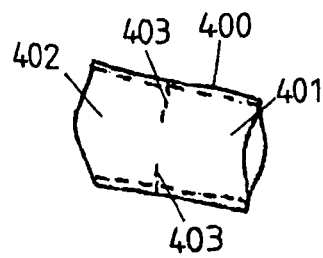
FIG. 9A shows a first exemplary embodiment of a fabric protective element which can be mounted to a gas generator.

According to FIG. 9A, a fabric protective element 400 is formed in a tubular-shaped manner with two open ends. It forms a first partial section 401 and a second partial section 402 which are connected to each other in the longitudinal direction. According to FIG. 9, a section 250 of an elongated gas generator 200 is arranged in the first partial section 401, the gas generator 200 comprising a gas escaping area 230.

Figure 9B:
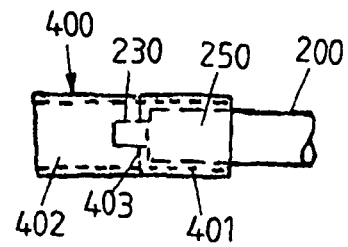
FIG. 9B shows the fabric protective element of FIG. 9A mounted to a gas generator.

Two seams 403 are provided between the first partial section 401 and the second partial section 402, extending perpendicularly to the longitudinal direction of the fabric protective element 400, wherein the seams 403 serve to fix the section 250 of the gas generator 200, which is arranged in the first partial section 401 according to FIG. 9B, in this first partial section 401. Thereby, provision can be made for that the gas escape area 230 protrudes through an opening formed by the two seams 403.

Figure 10A:
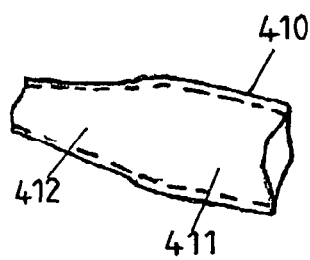
FIG. 10A shows a second exemplary embodiment of a fabric protective element which can be mounted to a gas generator.
Figure 10B:
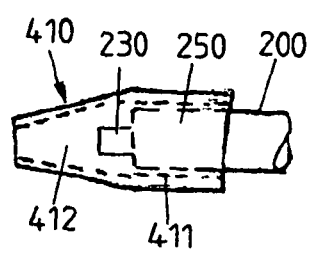
FIG. 10B shows the fabric protective element of FIG. 10A mounted to a gas generator.

In FIGS. 10A and 10B, a second exemplary embodiment of a fabric protective layer 410 is depicted. Also this has a first partial area 411 and a second partial area 412. The second partial area 412 is characterized by a tapered cross section. It is ensured by the tapered cross section of the second partial area 412 that the section 250 of the gas generator 200, which is arranged in the first partial area 411, is fixed within the first partial area 411.

The tapered second partial area 412 additionally makes a nozzle for the escaping gas stream available. In general, influence can be exerted on the direction and speed of the gas stream by the shape of the second partial area of the fabric protective element.

Figure 11A:
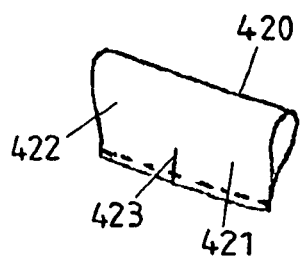
FIG. 11A shows a third exemplary embodiment of a fabric protective element which can be mounted to a gas generator.
Figure 11B:
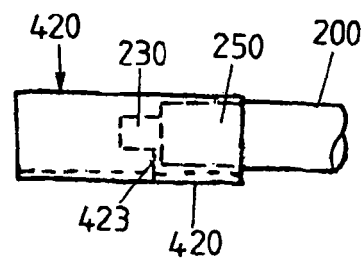
FIG. 11B shows the fabric protective element of FIG. 11A mounted to a gas generator.

In a third exemplary embodiment according to FIGS. 11A, 11B a tubular element 420 is provided which is formed by an essentially rectangular fabric piece which is folded once and the edges of which laying opposite the fold are connected to each other by a seam. Again, a perpendicularly extending seam 423 is provided which separates the first partial area 421 comprising the section 250 of the gas generator 200 with the gas escape area 230 from the second partial area 422.

Figure 12A:
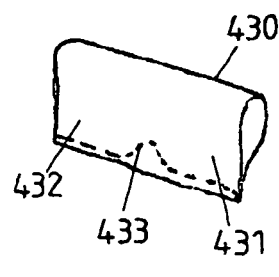
FIG. 12A shows a fourth exemplary embodiment of a fabric protective element which can be mounted to a gas generator.
Figure 12B:
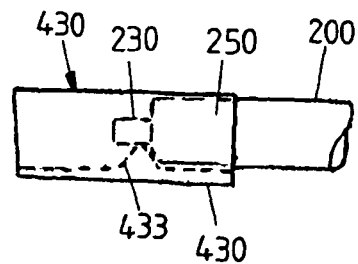
FIG. 12B shows the fabric protective element of FIG. 12A mounted to a gas generator.

The exemplary embodiment of FIGS. 12A, 12B essentially corresponds to the exemplary embodiment of FIGS. 11A, 11B, wherein here, however, the seam separating the first partial area 431 from the second partial area 432 is formed by a filet indentation 433 of the border seam of the fabric protective element 430.

Figure 13A:
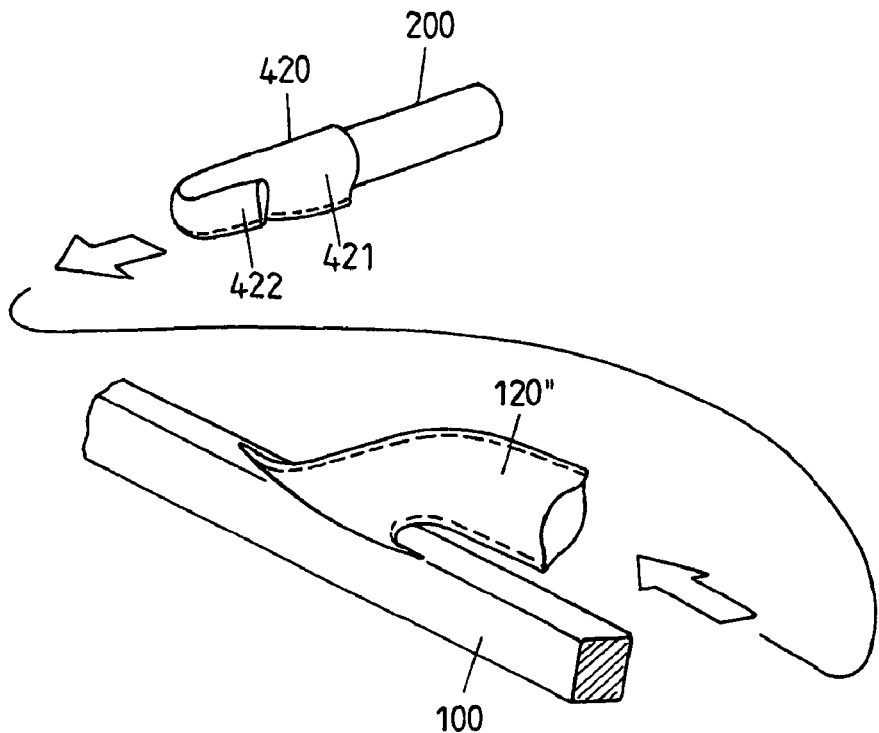
FIG. 13A schematically shows the arrangement of a gas generator with a fabric protective element mounted to it in a filling piece of an airbag.
Figure 13B:
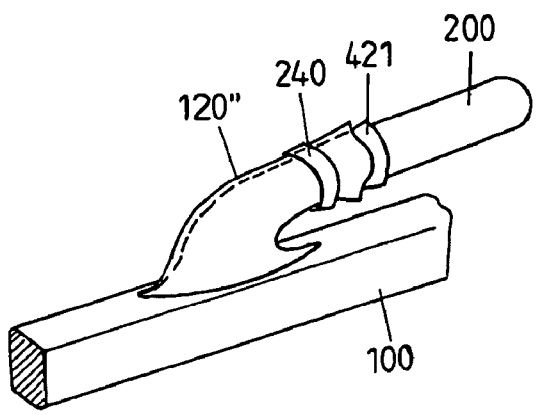
FIG. 13B shows the readily mounted arrangement of FIG. 13A.

According to FIG. 13A, provision is made for mounting an end of a gas generator provided with such a fabric protective element in a filling piece 120" of an airbag that the second partial area 422 is laterally flapped back before inserting into the filling piece 120". Thereby, the impact of the gas initially escaping from the gas generator 200 in case of activation is reduced since the gas has at first to erect the flapped area 422. However, a flapping-back of the second partial area 422 is effected only exemplarily and not necessarily. E.g., the second partial area can also be disorderedly inserted into the filling piece 120".

After arranging the section 250 of the gas generator 200 comprising the gas escape area 230 as well as the fabric protective element 420 directly surrounding the gas escape area 230 in the filling piece 120", the filling piece 120" is connected to the gas generator 200 in an essentially air-tight manner, e.g. by a clamp 240 and is fixed to it.

Figure 17:
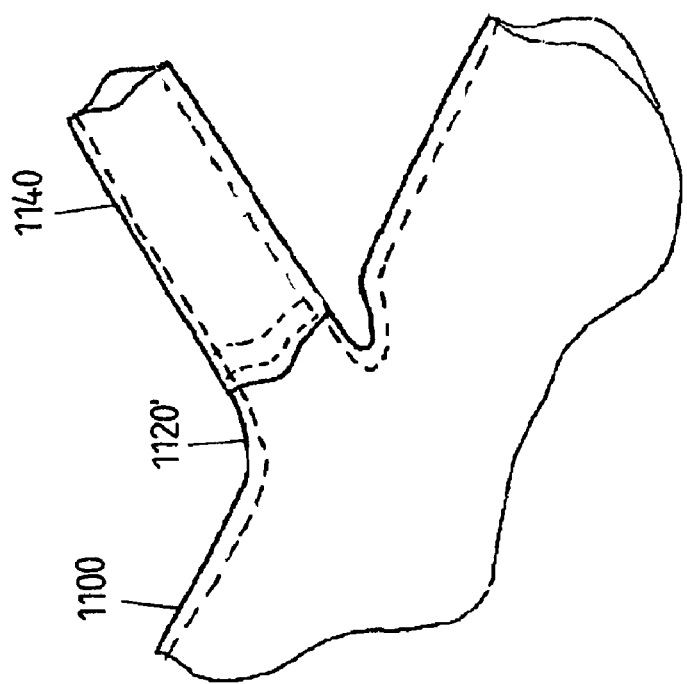
FIG. 17 shows the tubular area of FIG. 16 after being fixed at a filling piece of an airbag.
Figure 16:
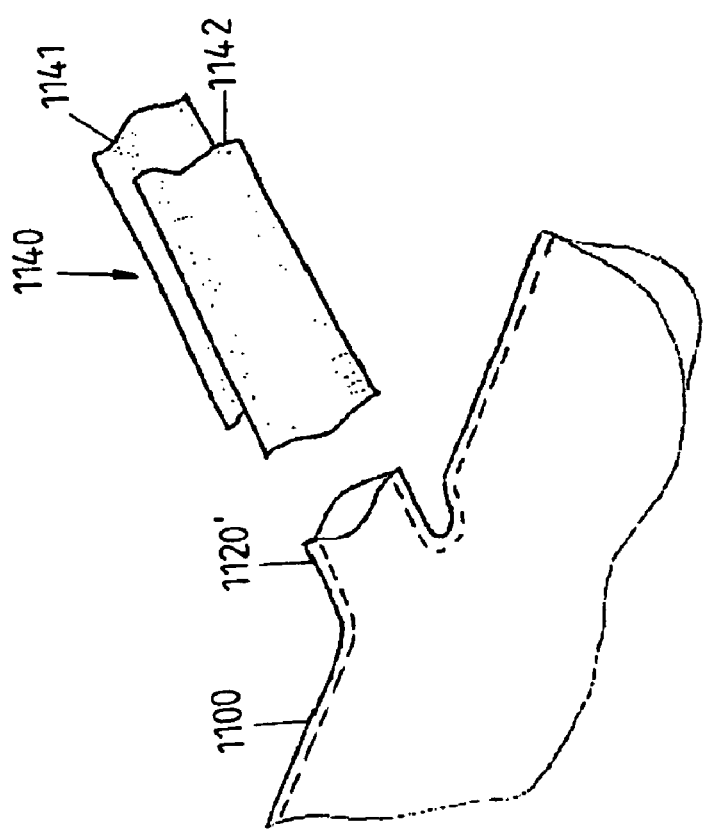
FIG. 16 shows an exemplary embodiment of a tubular area formed as separate part.

FIG. 16 shows an exemplary embodiment in which a tubular area 1140 which forms, after everting, a filling piece of an airbag 1100 is formed as separate part. It thereby consists, e.g., of two fabric cuts 1141, 1142 which are sewed or are otherwise connected to each other at their longitudinal sides. According to FIG. 17, the tubular area 1140 is secured at a filling piece stub 1120' to the airbag 1100, in particular sewed or glued to it or the like.

Figure 19:
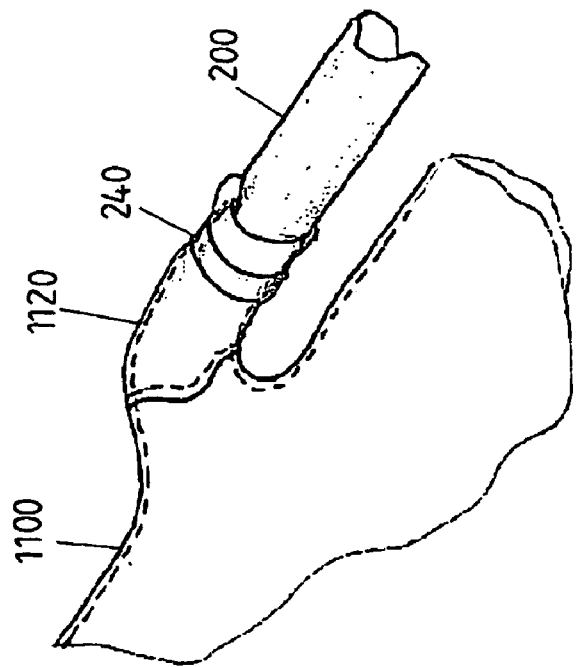
FIG. 19 shows the airbag of FIG. 18 with a gas generator being arranged in the filling piece and being connected to it.
Figure 18:
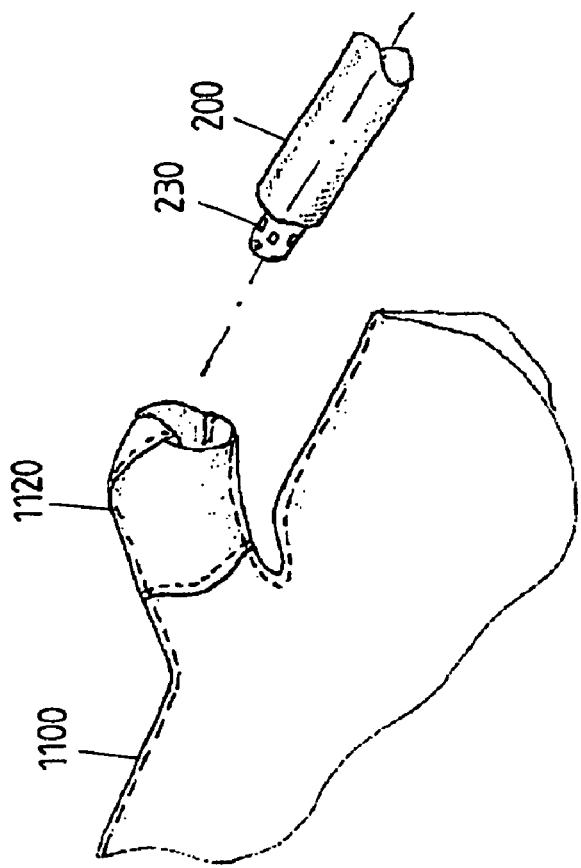
FIG. 18 shows an airbag having a filling piece which is formed by everting the tubular area of FIG. 17.

According to FIG. 18, the additional reinforcing layers formed by the tubular area 1140 come inwardly after putting-over to shield the airbag 1100 from escaping gases. A put-over filling piece 1120 is provided. An elongated gas generator 200 having a gas escape area 230 is subsequently mounted and, for this purpose, inserted into the filling piece 1120 and secured to it according to FIG. 19. Thereby, securing is, e.g., carried out by a clamp 240 surrounding a collar-shaped area of the gas generator 200 and the filling piece 1120 in an essentially gas-tight manner.

By the design of the filling piece as separate part being connected to the actual airbag described in FIGS. 16 to 19, the possibility of forming the filling piece from a stronger material is made available. Thereby, an additional reinforcement like, e.g., described in FIGS. 8A and 8B can be prevented.

It is pointed out that the put-over tubular area 1140 forms a fabric diffuser after the process of putting-over, the fabric diffuser distributing the gas escaping from the gas generator 200 in a targeted manner in the airbag. In the exemplary embodiment of FIGS. 16 to 19, the gas is guided through the open face side of the tubular area 1140 into the airbag. As explained with respect to FIG. 1, one or more openings can be defined in the tubular area in a targeted manner which openings distribute the gas inflowing during filling the airbag in a targeted manner in the airbag. The put-over tubular area is designated in the context of the present description also as put-over diffuser.

FIGS. 20 to 26 show exemplary embodiments in which a put-over diffuser is realized at an airbag 2100 which is provided for the use at side airbags. By an according design of the airbag mouth, an according design can also be carried out at other airbag types, particularly at head airbags.

Figure 20:
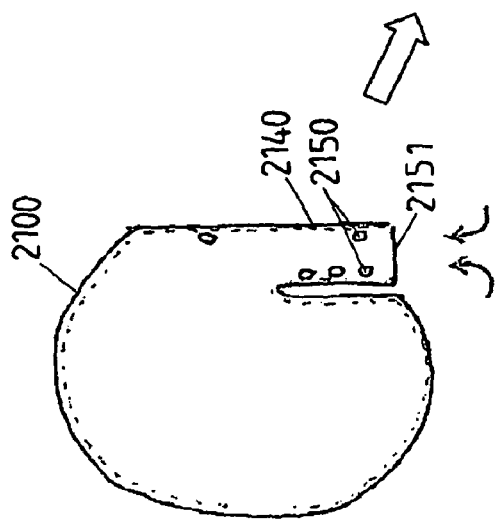
FIG. 20 shows a spread, non-inflated side airbag having a tubular area being formed by the airbag layout.
Figure 21:
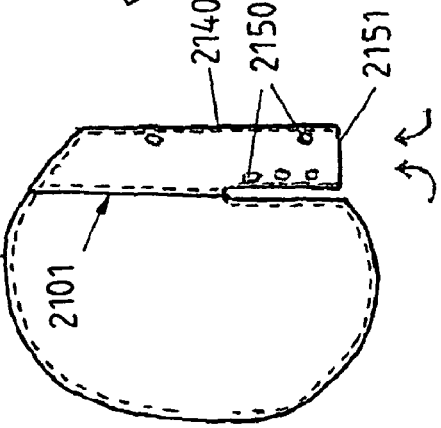
FIG. 21 shows an airbag according to FIG. 20, wherein the tubular area is formed as a separate part which is sewed together with the airbag.

According to FIG. 20, again a tubular area 2140 is provided. In the embodiment of FIG. 20, the tubular area 2140 forming a put-over diffuser after everting is formed from the airbag cut. In FIG. 21, the tubular area 2140 is formed as extra part and subsequently connected to the airbag 2100. The tubular area 2140 thereby is sewed to a longitudinally extending outer edge 2101 of the airbag 2100 and extends parallel to this.

In both variants, a plurality of gas escape openings 2150 are realized in the fabric of the tubular area 2140 in a defined position. In the depicted exemplary embodiment, these gas escape openings 2150 are provided by round openings. Alternatively, they can be formed also by interruptions of the edge seam. Additionally, the face side of the tubular area 2140 forms a gas escape opening 2151.

Figure 22:
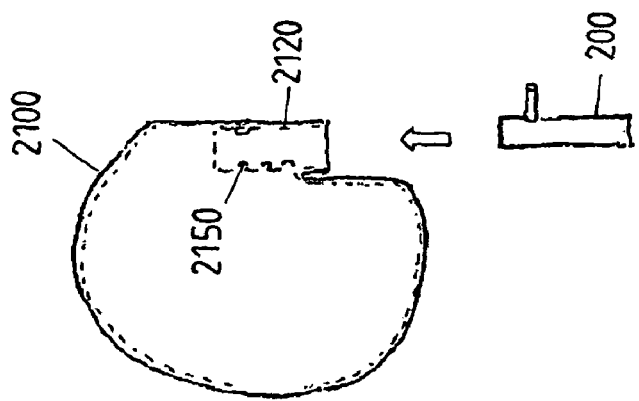
FIG. 22 shows an airbag having a filling piece which is formed by everting the tubular area of FIG. 20 or of FIG. 21, wherein the area put over inwardly forms a put-over diffuser.

FIG. 22 shows the put-over tubular area which forms a filling piece and a fabric diffuser 2120 in the airbag. Also visible are the outflow openings 2150 which achieve a gas distribution function.

Figure 23:
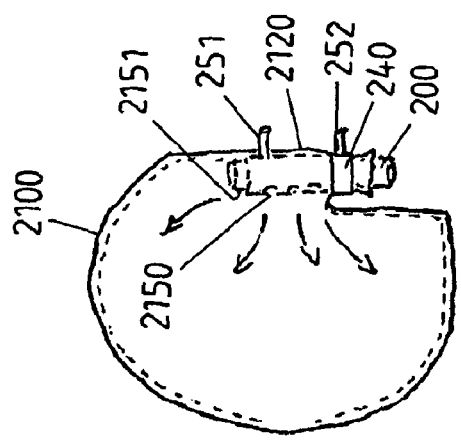
FIG. 23 shows an airbag according to FIG. 22 with a mounted gas generator.

Subsequently, according to FIG. 23, an elongated gas generator 200 is inserted into the filling piece 2120 realized in the described manner. Mounting can, e.g., be carried out by two bolts 251, 252 and/or by an additional clamp 240. The gas escape out of the put-over diffuser 2120 is carried out in a targeted manner via the gas escape openings 2150 as well as the face-sided opening 2151.

FIG. 24 shows an exemplary embodiment in which the face side of the tubular area 2140 is, different to the FIGS. 20, 21, stitched up. Accordingly, after everting (FIG. 25) and securing the gas generator (FIG. 26), a gas escape can no longer be effected via the face side, but only in the direction of the airbag 2100 to the front, i.e., perpendicular to the longitudinal direction of the put-over diffuser 2120, by means of the gas escape openings 2150. Generally, the gas escape through the gas escape openings 2150 can be arbitrarily controlled in different directions. The gas generator unit 200 can again be connected to the airbag by two bolts 251, 252 and/or by an additional clamp 240.

FIGS. 27 to 32 show an exemplary embodiment in which a putting-over in cross direction of an area 3140 being open at both ends and being connected at a longitudinal side to an airbag 3100 is carried out which tubular area 3140 projects before its putting-over from the airbag 3100 and forms after putting-over a receiving area for a gas generator. Such a put-over diffuser can again be formed either from the airbag layout or from additional layers which are then subsequently connected to the airbag. The first variant is shown in FIG. 27, the second variant in FIG. 28.

According to FIG. 29, the tubular area 3140 is, in contrast to the exemplary embodiments depicted so far, not put over in the longitudinal direction but in cross direction. The elongated receiving area 3160 arising thereby serves for receiving an elongated gas generator 200.

Figure 30:
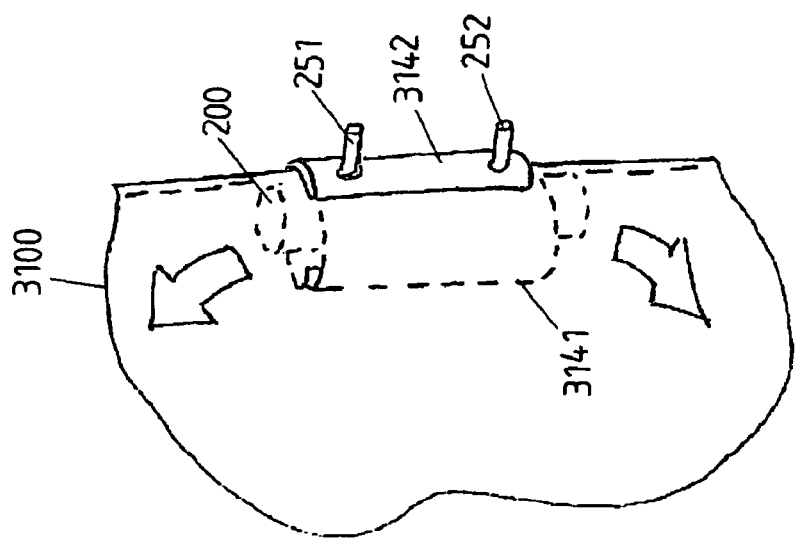
FIG. 30 shows a section of the airbag of FIG. 29, wherein the layers put-over inwardly are depicted.

The process of putting-over is visible in more detail in the enlarged depiction of FIG. 30. The elongated area 3140 is inwardly put-over by the cross putting-over and there forms an essentially cylinder-shaped fabric diffuser 3141. Fabric areas not being inwardly put-over thereby form two tabs 3142, 3143 which can be flapped onto each other.

Figure 31:
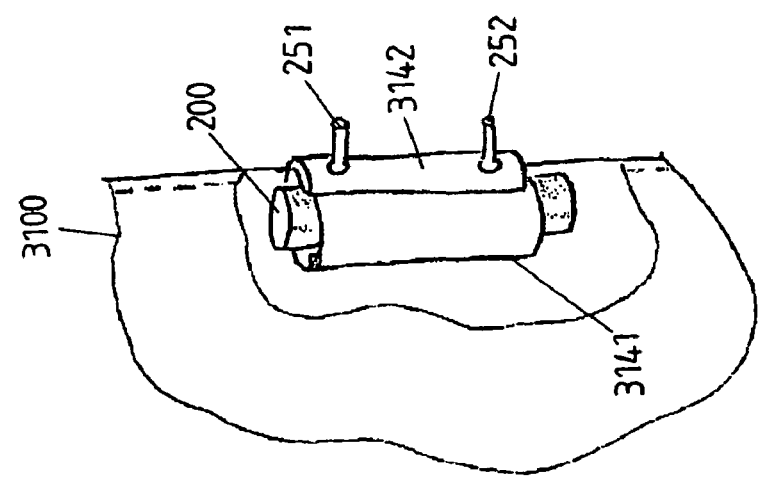
FIG. 31 shows the airbag of FIG. 30 with a mounted gas generator.
Figure 32:
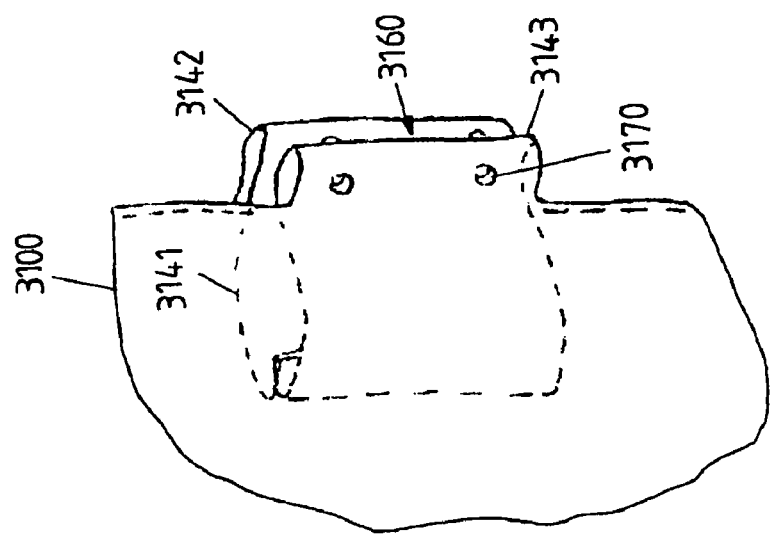
FIG. 32 schematically shows the gas escape from the gas generator in the airbag arrangement according to FIG. 30.

Openings 3170 of the tubular area 3140 in the area of the tabs 3142, 3143, which openings are thus formed at an area of the tubular area 3140 not inwardly put over, serve for connecting the tabs 3142, 3143 to each other and for the connection to a gas generator 200, as is depicted in FIGS. 31 and 32.

After the process of putting-over, a gas generator 200 is mounted. For mounting, the gas generator 200 is inserted into the elongated receiving area 3160. Subsequently, the tabs 3142, 3143 are flapped onto each other so that they surround the gas generator 200, and a fixation is carried out by bolts 251, 252 connected to the gas generator 200 as well as by openings 3170, cf. FIG. 31.

According to FIG. 32, a gas escape can be effected upwards or downwards. If gas escape openings are formed in the cylinder-shaped fabric diffuser 3141, for instance according to the embodiments of FIGS. 24 to 26, also a gas escape perpendicular thereto, i.e. to the front into the airbag 3100 can be realized.

In the described exemplary embodiments, the put-over diffuser additionally connected to the airbag can be made from another material or from another, particularly stronger airbag fabric to prevent laborious separate reinforcing layers. In this case, the airbag cut can be optimized to achieve the best material utilization. The gas distribution in the airbag can be controlled in a targeted manner with the put-over diffuser. Thereby, the gases can directly flow into the airbag and ensure a desired filling of the airbag.

The invention is in its implementation not limited to the preceding descriptions of exemplary embodiments. E.g., variations are possible with respect to kind and shape of the airbag, the presence of one or several airbag chambers, the shape and length of the filling piece as well as with respect to the used gas generators. The described airbag can be used in connection to any airbag material and any module configuration. The shown diffuser variants can in particular be used for side airbags as well as for head airbags.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

The priority application, German Patent Application 10 2007 056 137.9, filed Nov. 20, 2007, including the specification, drawings, claims and abstract is incorporated herein by reference in its entirety.

What is claimed is:

1. Airbag, the airbag comprising:
a tubular area,
a filling piece for filling the airbag with gas of a gas generator,
the filling piece being formed by putting-over the tubular area of the airbag in the longitudinal direction,
wherein an end of the tubular area faces the airbag interior and comprises a face side located at a terminus of the tubular area,
wherein said end of the put-over tubular area comprises two openings which are arranged to distribute gas inflowing from a gas generator in a targeted manner into the airbag,
wherein the two openings are provided in the airbag in an uninflated state,
wherein the terminus of the tubular area comprises a seam, the seam defining the two openings,
wherein the terminus of the tubular area is at least partially closed by the seam,
wherein the two openings comprise one or two lateral openings, and
wherein when filling the airbag with gas the inflowing gas is distributed by the two openings in exactly two partial gas streams into the airbag in a defined manner.

2. Airbag according to claim 1, wherein the end of the tubular area facing the airbag interior after it has been put over reaches into the airbag interior.

3. Airbag according to claim 1, wherein the airbag possesses an outer edge extending longitudinally and in that the part of the tubular area to be everted extends essentially parallel to the outer edge before its everting.

4. Airbag according to claim 1, wherein the end of the tubular area facing the airbag interior after it has been everted is beveled.

5. Airbag according to claim 1, wherein the filling piece is formed such that it is suited to receive at least a section of a gas generator and can be fixed to the gas generator.

6. Airbag according to claim 1, wherein the filling piece is formed such that it is suited for receiving at least a section of a diffuser and can be fixed to the diffuser or to a gas generator connected to the diffuser.

7. Airbag according to claim 1, wherein the put-over tubular area reaches into the airbag interior and therein forms a diffuser which distributes gas of a gas generator in a targeted manner in the airbag.

8. Airbag according to claim 1, further comprising:
at least one additional reinforcing layer,
said at least one additional reinforcing layer being at least partially also put-over during putting-over of the tubular area.

9. Airbag according to claim 8, wherein the at least one additional reinforcing layer comprises two fabric pieces wherein the fabric piece in each case is sewed or glued to the upper side and the lower side of the tubular area.

10. Airbag according to claim 8, wherein the at least on additional reinforcing layer comprises a fabric piece which is laid around the tubular area and is sewed or glued at its ends to the tubular area.

11. Airbag, the airbag, comprising:
a tubular area,
an outer, longitudinally extending edge extending along the longitudinal length of the airbag, wherein the tubular area protrudes angularly from the outer, longitudinally extending edge of the airbag when the airbag is flat and outspread,
a filling piece for filling the airbag with gas of a gas generator,
the filling piece being formed by putting-over the tubular area of the airbag in the longitudinal direction,
wherein an end of the tubular area faces the airbag interior and comprises a face side,
wherein the end of the put-over tubular area comprises two openings which are arranged to distribute gas inflowing from a gas generator in a targeted manner into the airbag,
wherein the two openings are provided in the airbag in an uninflated state,
wherein a terminus of the tubular area comprises a seam, the seam defining the two openings,
wherein the terminus of the tubular area is at least partially closed by the seam,
wherein the face side is oriented bevelled with respect to the longitudinal direction of the tubular area,
wherein one of the two openings is a lateral opening,
wherein when filling the airbag with gas the inflowing gas is distributed by the two openings in exactly two partial gas streams into the airbag in a defined manner.

* * * * *